United States Patent
Khodorkovsky et al.

(10) Patent No.: US 7,734,941 B2
(45) Date of Patent: Jun. 8, 2010

(54) POWER MANAGEMENT SCHEME EMPLOYING AN INDICATOR OF A CURRENT DEVICE OPERATING CONFIGURATION THAT REQUIRES A MINIMUM PROCESSING POWER

(75) Inventors: Oleksandr Khodorkovsky, Toronto (CA); Vladimir Giemborek, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 780 days.

(21) Appl. No.: 11/469,049

(22) Filed: Aug. 31, 2006

(65) Prior Publication Data
US 2008/0058999 A1 Mar. 6, 2008

(51) Int. Cl.
*G06F 1/32* (2006.01)
(52) U.S. Cl. ...................... 713/323; 713/320
(58) Field of Classification Search .................. 713/300, 713/320, 323
See application file for complete search history.

(56) References Cited

U.S. PATENT DOCUMENTS

| 6,950,105 | B2 | 9/2005 | Giemborek et al. |
| 7,188,261 | B1 * | 3/2007 | Tobias et al. ................. 713/300 |
| 2004/0123170 | A1 * | 6/2004 | Tschanz et al. ............. 713/320 |
| 2005/0071705 | A1 | 3/2005 | Bruno et al. |
| 2005/0195181 | A1 | 9/2005 | Khodorkovsky |
| 2007/0079154 | A1 * | 4/2007 | Diefenbaugh et al. ....... 713/300 |

* cited by examiner

*Primary Examiner*—Chun Cao
(74) *Attorney, Agent, or Firm*—Vedder Price P.C.

(57) ABSTRACT

In a power management scheme, at least one indicator of at least one current device operating condition that affects an amount of power required to operate a device may be received. Based on the at least one indicator, a floor value for an operating parameter of the device (e.g. clock frequency or voltage) may be determined. At least one further indicator of at least one current device operating condition may further be received. Based on the at least one further indicator, a ceiling value for the operating parameter may be determined. Based on an indicator of current activity of the device, the operating parameter may be dynamically adjusted to a value between the floor value and the ceiling value, to control power consumption by the device. In some embodiments, the value may be adjusted to only the ceiling value or the floor value, e.g. by selectively applying a scaling ratio.

29 Claims, 4 Drawing Sheets

| State Table 32 | FLOOR FREQUENCY 38 | CEILING FREQUENCY 40 | FLOOR VOLTAGE 42 | CEILING VOLTAGE 44 | |
|---|---|---|---|---|---|
| 34 | 100 MHz | 300 MHz | 0.95V | 1.10V | Power Conservation State |
| 36 | 100 MHz | 700 MHz | 0.95V | 1.20V | Performance State |

POWER MANAGEMENT SCHEME EMPLOYING AN INDICATOR OF A CURRENT DEVICE OPERATING CONFIGURATION THAT REQUIRES A MINIMUM PROCESSING POWER

FIELD OF TECHNOLOGY

The present disclosure relates to a power management scheme for a power-consuming device, and more particularly to a power management scheme employing a dynamically adjustable operating parameter range.

BACKGROUND

Efficient use of power is an important design objective for many contemporary electronic devices, such as personal computers, notebook or laptop computers, personal digital assistants (PDAs), portable music players and cellular telephones. By limiting the amount of power consumed by a device, benefits such as reduced heat output and prolonged battery life may be achieved.

It is known to set the value of at least one operating parameter for a power-consuming device based in part on a detected degree of activity of the device. The operating parameter may for example be a clock frequency or a particular voltage to be applied to integrated circuitry within the device. The degree of activity may be determined by periodically polling a signal reflective of the activity of the device. If the polling reveals that the device is wholly or partially idle, the clock frequency may be lowered by a predetermined amount (e.g. by applying a predetermined scaling ratio) or the voltage may be dropped to a predetermined, lower level.

In some cases, however, even the application of a lowered operating parameter value may still result in an unnecessarily high consumption of power by the device. This may occur for example when the predetermined, lowered operating parameter value was chosen to guarantee that, when the value is applied, the device can still meet a worst-case scenario of maximum demand for computational power. For instance, if the device is a graphics subsystem responsible for generating signals representing graphics for presentation on one or more displays of an electronic computing device to which it is electrically connected, the lowered operating parameter value may have been chosen to guarantee that the device would continue to operate reliably even in the situation in which the device is driving multiple displays, each being set to the highest resolution possible (multiple displays and high resolution images generally requiring higher computational power from the device). Because the worst case scenario may occur only infrequently, however, the device may in many cases be consuming more power than necessary. Power wastage may be especially high when an operating parameter value necessary to support a worst-case scenario is significantly higher than a value necessary to support a normal scenario.

An alternative power management scheme which obviates or mitigates at least some of these shortcomings would be desirable.

SUMMARY OF THE INVENTION

In a power management scheme, at least one indicator of at least one current device operating condition that affects an amount of power required to operate a device may be received. Based on the at least one indicator, a floor value for an operating parameter of the device (e.g. clock frequency or voltage) may be determined. At least one further indicator of at least one current device operating condition may further be received. Based on the at least one further indicator, a ceiling value for the operating parameter may be determined. Based on an indicator of current activity of the device, the operating parameter may be dynamically adjusted to a value between the floor value and the ceiling value, to control power consumption by the device. In some embodiments, the value may be adjusted to only the ceiling value or the floor value, e.g. by selectively applying a scaling ratio.

In one aspect, there is provided a method of operating a power-consuming device, comprising: receiving at least one indicator of at least one current device operating condition that affects an amount of power required to operate the device; based on said at least one indicator, determining a floor value for an operating parameter of the device; further receiving at least one further indicator of at least one current device operating condition; based on said at least one further indicator, determining a ceiling value for said operating parameter; and based on an indicator of current activity of the device, dynamically adjusting said operating parameter to a value between said floor value and said ceiling value, to control power consumption by the device.

In another aspect, there is provided a method of operating a power-consuming device, comprising: receiving at least one indicator of at least one current device operating condition affecting the amount of power required to operate the device; based on said at least one indicator, determining an operating range for an operating parameter of the device; and based on a current activity level of the device, dynamically adjusting said operating parameter within said range, to control power consumption by the device.

In yet another aspect, there is provided a machine-readable medium storing machine-executable code for execution by a power-consuming device, comprising: machine-executable code for receiving at least one indicator of at least one current device operating condition that affects an amount of power required to operate the device; machine-executable code for determining, based on said at least one indicator, a floor value for an operating parameter of the device; machine-executable code for further receiving at least one further indicator of at least one current device operating condition; and machine-executable code for determining, based on said at least one further indicator, a ceiling value for said operating parameter.

In still another aspect, there is provided a power-consuming device comprising: a processor; and memory in communication with said processor storing: machine-executable code for receiving at least one indicator of at least one current device operating condition that affects an amount of power required to operate the device; machine-executable code for determining, based on said at least one indicator, a floor value for an operating parameter of the device; machine-executable code for further receiving at least one further indicator of at least one current device operating condition; and machine-executable code for determining, based on said at least one further indicator, a ceiling value for said operating parameter.

In yet another aspect, there is provided a power-consuming device comprising: circuitry for receiving at least one indicator of at least one current device operating condition that affects an amount of power required to operate the device; circuitry for determining, based on said at least one indicator, a floor value for an operating parameter of the device; circuitry for further receiving at least one further indicator of at least one current device operating condition; circuitry for determining, based on said at least one further indicator, a ceiling value for said operating parameter; and circuitry for dynamically adjusting, based on an indicator of current activity of the device, said operating parameter to a value between said floor value and said ceiling value, to control power consumption by the device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an exemplary embodiment of this invention:

FIG. 2 is a schematic diagram illustrating a power consumption state table in memory of the device of FIG. 1.

DETAILED DESCRIPTION

Figure 1:
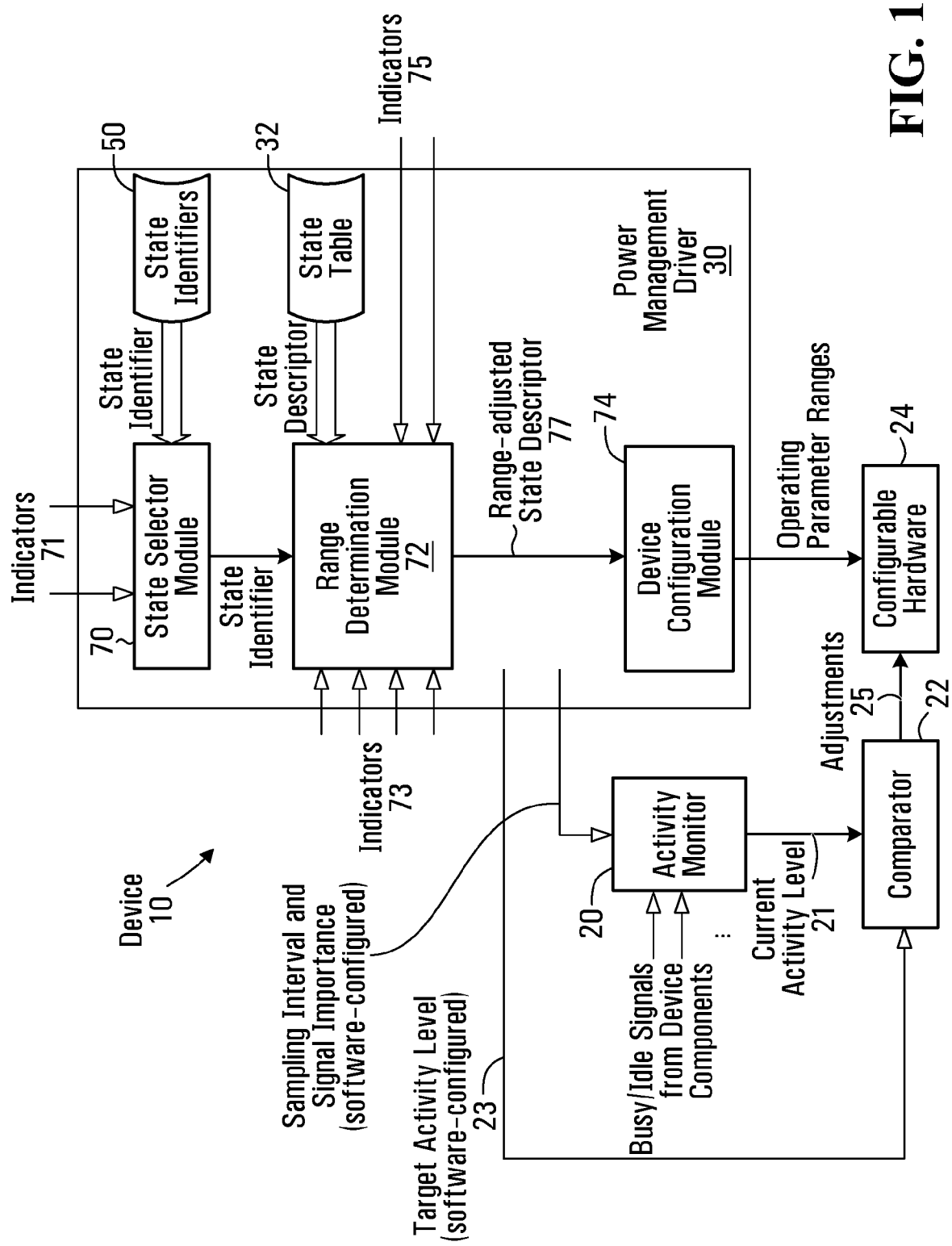
FIG. 1 is a schematic diagram illustrating a graphics processing unit, which is an example of a power-consuming device.

FIG. 1 illustrates a particular type of power-consuming device, namely, a graphics subsystem (GSS) 10. The GSS 10 (also referred to simply as "device 10") is a combination of hardware and software components whose purpose is to generate two-dimensional, three-dimensional and/or multimedia graphics for display by an electronic computing device to which it is electrically connected (the "host device"). The hardware of GSS 10 includes a graphics processing unit (GPU) which is not expressly shown. The GSS 10 may be implemented as a single application-specific integrated circuit (ASIC) and, depending upon the nature of the host device, may be integrated directly with other circuitry of the host device (e.g. as part of an integrated graphics solution, as part of the host itself, etc.) or may constitute a dedicated graphics card that is connected to a motherboard of the host device via a local bus. Host devices with which the GSS 10 may be used may include personal computers, notebook or laptop computers, portable video game units, portable digital assistants (PDAs), cellular telephones and the like. Depending upon the nature of the host device, the host device may have a cathode ray tube (CRT), a liquid crystal display (LCD) screen, or other type of display upon which the generated graphics are displayed.

The GSS 10 effects a power management scheme, which is a focus of the present description. Only components pertaining to the power management scheme are shown in FIG. 1. The illustrated components include hardware components and a software component. The hardware components include an activity monitor 20, a comparator 22 and a configurable hardware 24. The software component is a power management driver 30. The driver 30 may form part of an overall software product which may be referred to as a graphics driver.

Examining the hardware components first, the activity monitor 20 is circuitry within the GSS 10 which is responsible for generating an indicator of a current activity level 21 indicative of a degree to which the GSS 10 is "busy", i.e., is actively engaged in processing. The activity monitor 20 may comprise a subset (or "block") of the overall circuitry of a GSS ASIC in the present embodiment. Activity monitor 20 receives signals indicating a degree of activity (or idleness) of multiple device components and generates the current activity level 21 based on these signals. In the present embodiment, the device components are other blocks within the GSS ASIC (not expressly illustrated). The other device components may be part of configurable hardware 22, which is described below. As will become apparent, the generated current activity level 21 forms the basis for selecting an operating parameter value within a dynamically changing operating parameter range.

In the present embodiment, each of the busy/idle signals received by activity monitor 20 indicates one of two conditions: "busy" or "idle". Signals of this type are referred to as binary signals. The monitor 20 may generate the indicator of current activity level 21 based on all of the signals received from other blocks within the GSS ASIC or a subset of these signals. The subset of signals that is considered in computing the current activity level 21 is dynamically configurable through software (specifically, by power management driver 30). For example, a dynamically configurable bitmask may be applied ("ANDed") to a received set of binary signals in order to filter away unimportant signals. The "importance" of signals may change over time due to such factors as whether the device is working in a performance mode or a power conservation mode for example.

The activity monitor 20 generates the current activity level 21 by sampling the currently important signals over a sampling interval. The duration of the sampling interval is configured by the power management driver 30. Configuration of the sampling interval may for example be achieved by setting the number of ticks of a reference clock to be counted before the interval is deemed to elapse. In the present embodiment, the current activity level 21 is a value from zero to one. This is referred to as a "percentage value" for convenience (since it would constitute a percentage if multiplied by 100). The percentage value is determined by counting the number of ticks during which all of the currently important signals indicate "busy" (or, depending upon the manner in which the current activity level 21 is computed, the number of tick during which a majority of the currently important signals indicate busy) and by dividing that number by a total number of ticks in the sampling interval. In some embodiments, the indicator of a current activity level 21 may not be a percentage value, but may instead be a binary value that either indicates "busy" (if all or most of the important blocks are busy) or "idle" (if all or most of the important blocks are idle). A person skilled in the art will appreciate that numerous approaches exist for assessing the overall activity of a device based on the activity of a number of component blocks or, more generally, based on the activity of a number of device components.

In the present embodiment, the signals received by monitor 20 originate from thirteen different blocks in the GSS 10, none of which are expressly illustrated in FIG. 1. In alternative embodiments, signals can be received from a greater or lesser number of blocks or other types of device components such as software components. For components that are virtually always active or always active, such as a display engine block responsible for refreshing frames or fields on a display of a host device, a busy/idle signal may be ignored, because it can simply be assumed that the engine will be busy with little risk of being incorrect. Such assumptions may simplify the computation of the current activity level 21.

Comparator 22 is circuitry that receives a current activity level 21 from activity monitor 20 as well as a target activity level 23 from power management driver 30 (described below) and generates therefrom one or more operating parameter value adjustments 25. The purpose of the comparator 22 is to generate an output for dynamically adjusting operating parameter values within the current operating range, which is determined by software in the present embodiment (as described below). The adjustments 25 are based on current device activity. The circuitry 22 is referred to as a comparator because its output (adjustments 25) is based on the difference between the two inputs (current activity level 21 and target activity level 23).

The first input of comparator 22, i.e. current activity level 21, indicates an overall level of activity of the device 10, as described above.

The second input of comparator 22, i.e. target activity level 23, specifies a target level of activity for the device 10. The level 23 may be represented in the same manner as the current activity level 21, e.g., as percentage value. If the current activity level 21 is greater than the target activity level, then the adjustments 25 are made to promote greater processing power. If, on the other hand, the current activity level 21 is less than the target activity level, then adjustments are made to promote lesser device processing power. This is done to promote optimal device performance and to conserve power. The target activity level 23 is configured by the power management driver 30.

The output of comparator 22, namely, operating parameter value adjustments 25, are values that are dependent upon the difference between the current activity level 21 and the target activity level 23. The dependency of adjustments 25 on the difference between the two inputs may be linear, piecewise-linear or non-linear for example.

Configurable hardware 24 is a category of hardware which is capable of being configured to operate in multiple modes resulting in multiple levels of power consumption at the device. Control of power consumption by this hardware 24 is the objective of the power management scheme described herein. Many types of hardware may be included within configurable hardware 24. In the present embodiment, configurable hardware 24 includes a clock generator for generating clock signals of various frequencies for clocking sequential logic within the device and a voltage regulator capable of generating different voltages to be applied to integrated circuitry within the device (the voltage regulator may actually be external to the device 10). Some types of hardware 24 may have registers to which values can be written in order to dynamically configure the mode of operation of the device (e.g. to scale frequency or voltage) and thus change the degree to which power is consumed by the hardware 24.

Turning to the sole software component, power management driver 30 is software that is generally responsible for effecting the power management scheme at the GSS 10 that is a focus of the present disclosure. The power management driver 30 maintains a state table 32 and a set of state identifiers 50. Driver 30 also includes three software modules, namely, a state selector module 70, range determination module 72, and a device configuration software module 74 for setting and applying operating parameter ranges.

State table 32, which is illustrated in greater detail in FIG. 2, is a table in host device (CPU) memory which stores descriptors (e.g. records) for each of a set of N predefined power consumption states, where N is a positive integer greater than one. Each power consumption state defines a unique set of floor and ceiling values for a set of operating parameters. An operating parameter is an adjustable operational setting that affects the manner in which power is consumed by the GSS 10. Each operating parameter is typically associated with a specific component of configurable hardware 24. Each state defines a floor and ceiling value for each operating parameter. The floor value defines a lower bound for the operating parameter while the ceiling value defines an upper bound for the operating parameter. Cumulatively, the floor and ceiling values define an operating range within which the operating parameter value is permitted to vary over time while the device is in the associated state. The operating parameter range is applied by communicating the range to the component, which may store the range, e.g., in one or more hardware registers. The value of the operating parameter at any given moment, which is governed by device activity, determines the power consumed by the relevant component of device 10.

For simplicity, the exemplary state table 32 of FIG. 2 describes only two states (i.e., N=2), namely, a power conservation state and a performance state. The power conservation state is for conserving power at the device 10 (e.g. for the purpose of extending battery life in the case where device 10 is a part of a portable device) while the performance state is for maximizing the performance of the device 10. These states are represented by state descriptors 34 and 36 (respectively). For simplicity, each state defines floor and ceiling values for only two operating parameters: clock frequency and voltage. Accordingly, each of the state descriptors 34 and 36 of FIG. 2 defines: a floor frequency 38; a ceiling frequency 40; a floor voltage 42; and a ceiling voltage 44. The clock frequency may represent a system clock frequency or a memory clock frequency for example. In some embodiments, multiple clock frequencies (e.g. a system clock frequency as well as a memory clock frequency) may be represented in each state. The voltage represents a voltage to be applied to integrated circuitry within the device 10, which voltage may be controlled by a voltage regulator component (not shown). It will be appreciated that the number of states and the number of operating parameters per state may be larger than two in other embodiments. The floor values of different states may be the same in some cases (e.g. as shown in FIG. 2) or may vary from state to state.

Referring again to FIG. 1, state identifiers 50 are a predefined set of identifiers which uniquely identify each of the states defined in state table 32, described above. Each state identifier is associated with one of the state descriptors of state table 32 but is defined separately from the descriptor. This is done for reasons of modularity. The separation permits the state selector module 70 to identify and select a particular state without knowledge or concern for the precise operating parameter value ranges defined for that state. State identifiers may be constants or hard-coded values, for example, and may provide meaningful names for the states. For instance, in the present example the state identifiers 50 may be "Power conservation" and "Performance" to correspond with the two state descriptors 34 and 36 (respectively) defined in state table 32 (FIG. 2).

State selector module 70 is a software module that is responsible for selecting an operative power consumption state from the states defined in state table 32 based on one or more state selection factors. The state selection factors are determined through receipt by state selector module 70 of indicators 71, such as interrupts, notifications, and messages. These indicators 71 may originate with various sources external to the power management driver 30, such as the GSS system Basic Input/Output System (BIOS), various GSS hardware, other drivers executed by the GSS 10, the operating system of the device, and/or software applications executed by the electronic device. Based on these indicators 71, the state selector module 70 selects one of state identifiers 50 to identify the desired power consumption state. The selected state identifier is communicated to the range determination module 72 for range determination (described below).

In many cases, a user preference setting specifying a mode of operation for device 10 may be the main state selection factor governing the state selection performed by software module 70. For example, a user may select a power conservation mode for such reasons as extending battery life, promoting cooler operation of the device or quieting the device (e.g. through a reduction in rotation speed of a cooling fan or disk drive spindle). Alternatively, the user may select a high performance mode, e.g., to support maximum resolution graphics generation for video game play. The user preference may be specified via a "control panel" user interface setting on the host device for example. Even when a user preference setting is the main state selection factor, however, other factors may still play a role in state selection and may even cause user preference settings to be overridden. For example, one factor that may impact upon a user preference setting is a characteristic of a power supply currently powering the device. For instance, when a user specifies a high performance mode and then later switches from an alternating current (AC) adapter to a direct current (DC) battery, the current state may automatically change from a power consumption state to a power conservation state (despite the user's setting) in order to maximize battery life. Of course, the user may be able to set the device back to a high performance mode, e.g. if the user acknowledges short battery life as an acceptable tradeoff for high performance operation. Those skilled in the art will appreciate that the number and type of state selection factors may vary in different embodiments, depending upon the prevailing power management considerations.

The range determination module 72 is responsible for receiving a state identifier from state selector module 70, retrieving the corresponding state descriptor from state table 32, and determining the operating parameter range by adjusting (if necessary) the floor and/or ceiling operating parameter values of the selected power consumption state. Different factors are considered when floor operating parameter values are adjusted as compared with ceiling operating parameter values.

Floor values are adjusted (if necessary) based on a set of indicators 73 of current device operating conditions that affect a minimum amount of power required to operate the device 10. These device operating conditions are referred to herein as "loading factors". The objective of adjusting floor values is to set the floor values to the minimum operating parameter values that are practically possible (i.e. to values associated with minimum power consumption) given current processing power demands upon the device. Indicators 73 may take the form of events, such as interrupts, notifications, and messages, which may originate with various sources external to the power management driver 30. In the present example, where device 10 is a graphics subsystem, the loading factors may be include the following:

(1) display configuration—this loading factor encompasses the number of display devices being driven by the device 10 and their type. As the number of displays increases, floor frequency and voltage values are adjusted upwardly in order to ensure sufficient processing power for generating images for all of the displays.

(2) display mode—this loading factor encompasses several sub-factors, namely, display device image resolution, color depth and refresh rate. As each of these sub-factors increases, floor frequency and voltage values are adjusted upwardly in view of the resultant increased demands for processing power.

(3) presence or absence of video overlay—if the device is currently processing video with an overlay, floor frequency and floor voltage values are adjusted upwardly as compared with a situation in which no video with overlay is being processed. As is known in the art, the term "overlay" refers to a video or graphic image that is overlaid onto another video image (e.g. a news correspondent's name or channel logo may be overlaid in the corner of a main video image). In digital video processing equipment, the main video image is typically fed from a frame buffer while the overlay image is fed from other memory. To ensure that both video image components can be retrieved and combined in time for presentation, memory clock speed is increased possibly along with a corresponding increase in voltage.

(4) display scaling ratios—certain displays, such as flat panel displays, may have a native resolution at which images are intended to be displayed for optimal appearance. It is possible for a user to set such displays to display images at a different, non-native resolution (e.g. to change a device from a native resolution of 1600×1200 pixels to 1024×768 pixels), perhaps in order to increase the size of displayed text. In this situation, computationally intensive display scaling must be performed. If the display device is incapable of performing such scaling, then the GSS 10 may be responsible for performing display scaling. To ensure that the device 10 completes this display scaling "on time" (i.e. before an image needs to be refreshed on the display), it may be necessary to adjust floor frequency and voltage values upwardly.

In contrast, ceiling operating parameter values are adjusted (if necessary) by the range determination module 72 based on a set of indicators 75 of device operating conditions that affect a maximum amount of power that should be consumed by the device. These device operating conditions are referred to herein as "limiting factors". Like indicators 73, indicators 75 may take the form of events originating with various sources external to the power management driver 30. Limiting factors may be different for different states, and may include the following:

(1) power source current limit—certain types of power sources (e.g. batteries or travel/"lite" AC adapters) may have relatively low upper limits as to the amount of current that is capable of being generated as compared with conventional power supplies (e.g. standard AC adapters). When such power sources are used, ceiling frequency and voltage values are adjusted downwardly in order to avoid a peak demand for power which exceeds the capacity of the power source.

(2) thermal event—this limiting factor may be a detected overheated device component for example. When a thermal event is detected, ceiling frequency and voltage values are adjusted downwardly to limit power consumption and thereby reduce device operating temperatures.

The result of the floor and ceiling adjustments is a range-adjusted state descriptor 77, which is passed to the device configuration software module 74. It is possible for the range determination module 72 to make no adjustment to the floor operating value, the ceiling operating parameter value, or both, if the loading factors and/or limiting factors do not warrant any adjustment. Thus, it is possible for the range-adjusted state descriptor 77 to match the state descriptor retrieved from state table 32 in some cases.

The device configuration module 74 is a software module that is responsible for configuring (programming) configurable hardware 24 with the floor and ceiling values indicated by the range-adjusted state descriptor 77. Module 74 essentially converts the floor and ceiling values expressed in descriptor 77, which are hardware-independent, into their hardware-specific equivalents, and then programs hardware 24 with these hardware-specific floor and ceiling values. Device configuration module 74 contributes to the modularity and reusability of the power management driver 30 because, should the hardware in another embodiment differ from hardware 24, only module 74 may need to be replaced by a module that is suitable for configuring the new hardware. The remaining modules 70 and 72 of driver 30 may be reused.

From the above description, it will be appreciated that two parallel "paths" are defined in device 10: a hardware path and a software path. The hardware path is defined by the activity monitor 20 and comparator 22. Its role is to dynamically adjust, based on device activity, the operating parameter values that are applied by configurable hardware 24. The software path is defined by range determination module 72 and device configuration module 74. The role of the software path is to dynamically adjust, based on current limiting factors and loading factors, the operating parameter range within which operating parameter values are permitted to vary at hardware 24. The hardware path and the software path operate in parallel and collectively effect the power management scheme described herein.

Figure 3:
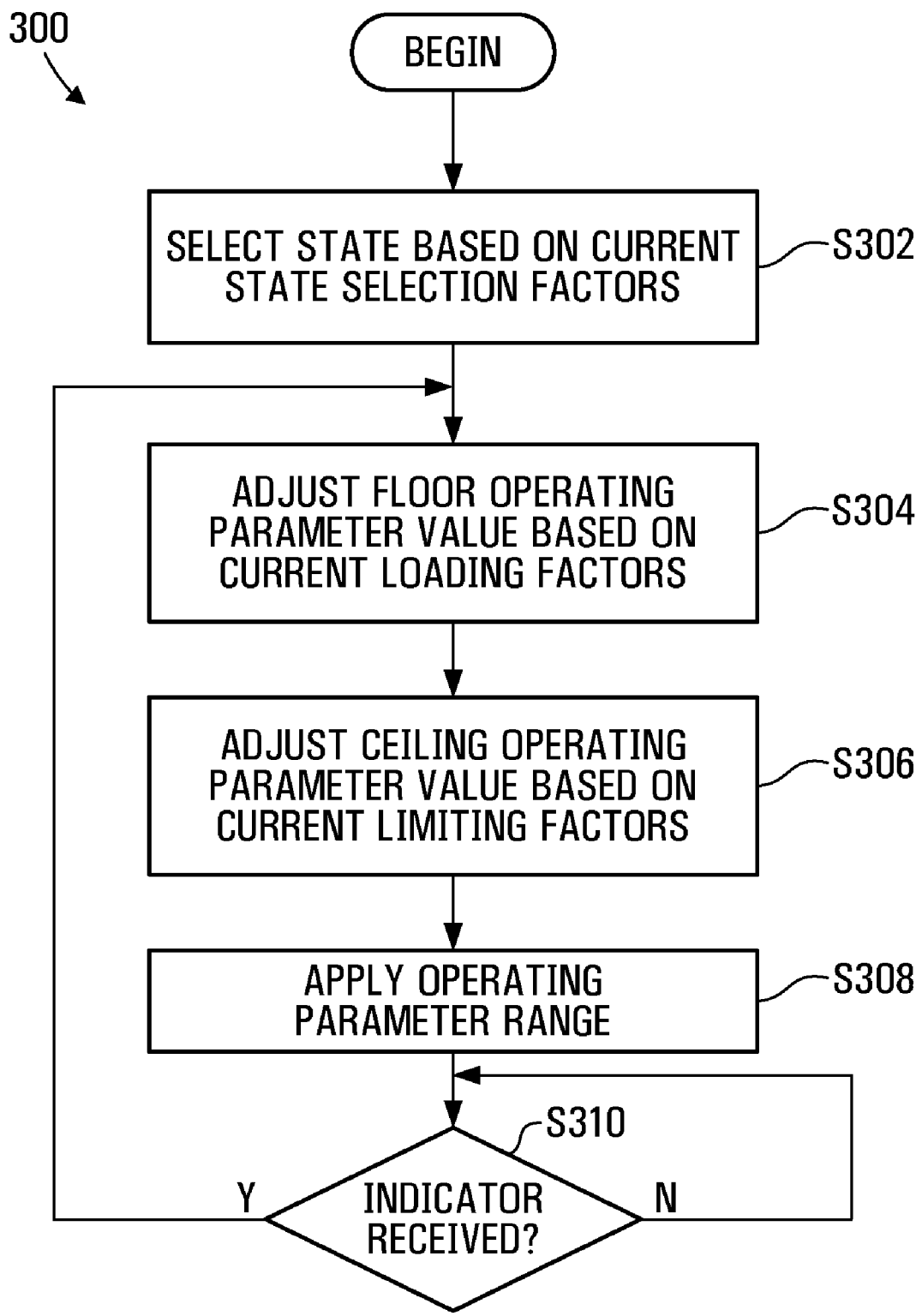
FIG. 3 is a flowchart illustrating operation of the device of FIG. 1.

Operation 300 of the software path is illustrated in FIG. 3. Operation 300 may be triggered by the detection of an event which impacts upon the appropriate power consumption level for the device 10.

Initially, a state is selected based on the current state selection factors (S302). For example, if a user preference for a high performance mode of operation has been specified and the power source is currently an AC adapter, a "Performance" state identifier 50 may be selected. State selection is performed by state selector software module 70 (FIG. 1) on the basis of indicators 71. The selected state identifier is passed to the range determination software module 72 for range determination.

When range determination software module 72 receives the state identifier from state selector module 70, it retrieves the corresponding state descriptor from state table 32. In the present example, state descriptor 36, which corresponds to the "Performance" state identifier, is retrieved. The software module 72 then engages in processing to adjust (if necessary) the floor and ceiling operating parameter values defined in the retrieved state descriptor.

First, the floor operating parameter values are adjusted based on the current loading factors (S304). In the present example, the floor operating parameter values are the floor clock frequency 38 (100 MHz) and the floor voltage 42 (0.95V) of descriptor 36 (FIG. 2). The loading factors that are considered in adjusting the floor operating parameter values are as described above, and are represented by indicators 73. Different embodiments may employ different approaches for weighting these factors. For illustration, it is assumed that the floor frequency is adjusted upwardly to 250 MHz and the floor voltage is adjusted upwardly to 1.05V to support the operation of multiple detected displays that are being driven by GSS 10.

Next, the ceiling operating parameter values are adjusted based on the current limiting factors (S306). In the present example, the ceiling operating parameter values are the ceiling clock frequency 40 (700 MHz) and the ceiling voltage 44 (1.2 v) of descriptor 36 (FIG. 2). The limiting factors that may be considered in adjusting the ceiling operating parameter values are as described above, and are represented by indicators 75. Again, different embodiments may employ different approaches for weighting these factors. For illustration, it is assumed that the ceiling frequency is adjusted downwardly to 600 MHz, and the floor voltage is adjusted downwardly to 1.15V, to limit heat generation in view of a detected thermal event.

The resulting range-adjusted state descriptor 77 is passed to the device configuration module 74. Module 74 converts the floor and ceiling values expressed in descriptor 77 into hardware-specific equivalents and applies them to the configurable hardware 24 (S308). This application involves programming the hardware 24 with the current operating ranges.

Should an indicator 73 or 75 change or a new indicator be received (S310), operation repeats from S304 in order to adapt the operating range to the currently prevailing set of loading factors and limiting factors. As a result, the frequency and voltage operating ranges may vary over time. This may cause the operating parameter values that are actually set within those ranges and applied at the device to also vary within the dynamically changing operating ranges, depending upon device activity.

If a state selection indicator 71 changes or a new indicator is received, then operation may repeat from S302.

Operation of the hardware path (i.e. activity monitor 20 and comparator 22) occurs in parallel with operation 300. The activity monitor periodically updates the current activity level 21 by sampling the currently important signals over a sampling interval. This activity level 21 is then used by the comparator 22 to adjust the current operating parameter values within the operating parameter value ranges that have been set by the software path (S308). The difference between the current activity level 21 and the software-configured target activity level 23 determines the magnitude of the adjustments 25 to be made to configurable hardware 24 in order to achieve the desired level of activity of device 10.

As a simple example, it is assumed that the current activity level 21 is 0.5, indicating an average degree of activity of 50% for the device 10, and that the target activity level is 0.75 (75%). This means that the device 10 is presently engaged in active processing only about one-half of the time, which is less than the desired level of being active three-quarters of the time. As a result, the frequency value is set to 300 MHz (which is near the bottom of the adjusted operating range of 250-600 MHz) and the voltage value is set to 1.05V (which is at the bottom of the adjusted operating range of 1.05V-1.15V). The values may be stored in registers of the relevant components of hardware 24 in order to dynamically configure their mode of operation (i.e. to scale frequency and voltage). In this example, it is assumed that both of the new operating parameter values are lower than previously applied values. When the new values are applied by the hardware 24, the device 10 is not able to perform its processing as quickly as before, and the activity level at the device will therefore increase as the device spends more time completing the same processing. As a result, the degree of activity of device 10 will tend to shift toward the target activity level 23 of 75%.

In general, if the size of the adjustments 25 is large, then the adjustments may be effected as a series of smaller adjustments. For instance, a large frequency adjustment may be made by reprogramming a feedback divider of a phase-locked loop (PLL) circuit to effect multiple smaller frequency adjustments.

In some embodiments, a finite impulse response (FIR) digital filter may be used to accumulate and filter a predetermined number of previous current activity level values for the purpose of determining the appropriate adjustments 25.

As should now be appreciated, because the applied operating parameter values are determined on the basis of current loading factors at device 10 rather than a worst-case scenario of maximum demand for computational power, the power management scheme may advantageously reduce overall power consumption at the device 10 as compared with known power management schemes. Moreover, the applied operating parameter values are sensitive to dynamically changing limiting factors which may limit a desired amount of power consumption at the device 10. This may also contribute to an overall reduction in power consumption.

It will be recognized that most aspects of the above-described operation can be implemented in software, firmware and/or hardware. In some embodiments, operation could be implemented largely or wholly in software or firmware. Such software or firmware may take the form of machine-executable code stored on a machine-readable medium, such as an optical disk or magnetic tape for example, which is ultimately loaded, either directly or indirectly, to the device.

Figure 4:
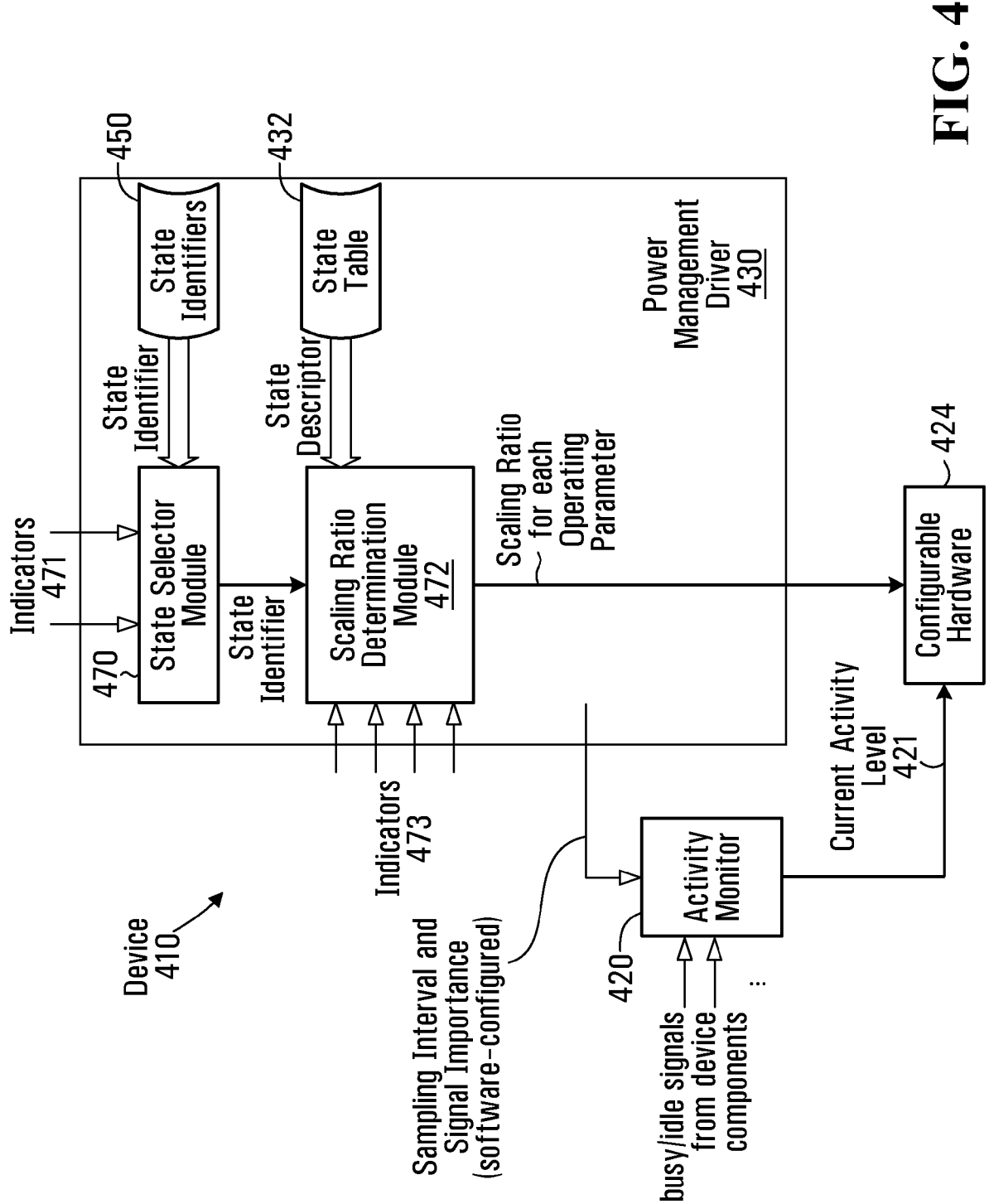
FIG. 4 is a schematic diagram illustrating an alternative embodiment of a power-consuming device.

FIG. 4 illustrates an alternative embodiment of a GSS 410 (also referred to simply as "device 410") which effects the same power management scheme as device 10 but in different manner than that described above. The device 410 is essentially a special case of device 10. The embodiment illustrated in FIG. 4 is, in certain respects, less flexible than the embodiment illustrated in FIG. 1, yet it is simpler than the first-described embodiment and may be cheaper to implement. The reduced flexibility results from the fact that device 410 is only capable of setting operating parameter values to one of two values: the ceiling value of the current operating range or the floor value of the current operating range. The simplicity results from the manner in which the operating parameter values are set—namely, by applying a scaling ratio.

Many of the hardware and software components of device 410, such as activity monitor 420, configurable hardware 424, state table 432, state identifiers 450, and state selector module 470, are similar to their counterpart components in FIG. 1 (which are identifiable by their use of the same reference numerals as the corresponding components of FIG. 4 minus 400). However, there are several differences between the device 410 and device 10.

For example, in device 410, a scaling ratio determination module 472 takes the place the range determination module 72 of device 10. A scaling ratio is a value between zero and one that is applied to operating parameter values such as frequency or voltage in order to cause the relevant configurable hardware 424 (e.g. a clock generator or voltage regulator) to reduce its power consumption. For example, if a scaling ratio of 0.5 is applied to a clock generator, clock frequency may be reduced by one-half. In the case of certain operating parameters such as clock frequencies, the use of a scaling ratio for adjusting the operating parameter value may be simpler than other approaches for adjusting the value, such as adjusting clock frequencies using PLL circuitry (as may be done in embodiment described above). For example, it may be computationally straightforward to skip every other pulse of a reference clock when applying a scaling ratio of 0.5 in order to achieve a desired clock speed reduction of one-half.

The scaling ratio determination module 472 of FIG. 4 is incapable of adjusting ceiling operating parameter values (unlike range determination module 72). Ceiling values are determined solely by the current state, which is selected by the state selector module 470 in a manner that is similar to the state selection performed by state selection module 70 of FIG. 1. Because module 472 does not adjust ceiling values, it does not receive any indicators analogous to indicators 75 of FIG. 1 which governed ceiling value adjustments in the first-described embodiment.

Scaling ratio determination module 472 adjusts floor operating parameter values (by selecting a scaling ratio to be applied by hardware 424) based on a set of indicators 473 of loading factors, which are similar to indicators 73 of FIG. 1. The scaling ratio that is selected for adjusting a floor value may be one of a number (e.g. seven) of predetermined scaling ratios of which the configurable hardware 424 is aware and capable of quickly implementing. For example, if the indicators 473 indicate that the device 410 is very lightly loaded, then the highest scaling ratio may be selected so that, when the device is idle and the scaling ratio is applied, power consumption is minimized. On the other hand, if the indicators 473 indicate that the device 410 is heavily loaded, then the lowest scaling ratio may be selected so that, when the device is idle and the scaling ratio is applied, power consumption is not minimized to the point at which the current loading factors cannot be supported.

Whatever scaling ratio is selected by module 472 is communicated to the configurable hardware 424. A device configuration module (not expressly illustrated) may be employed in order to convert a hardware-independent scaling ratio to a hardware-specific value or values and to program the hardware 424 with the hardware-specific value(s).

It is not necessary for the configurable hardware 424 of FIG. 4 to be capable of adjusting operating parameter values to numerous levels within an operating range. The hardware 424 only needs to be able to adjust operating parameter values to either the ceiling value of the range or the floor value of the range. The hardware may simply use the current activity level 421 to determine whether the floor value should be applied or the ceiling value should be applied. In the illustrated embodiment, the current activity level 421 is a binary value that either indicates that the device is "busy" overall or "idle" overall. When the indicator indicates "busy" (which may mean that the device is wholly busy or mostly busy), no scaling ratio is applied and the hardware 424 operates at the ceiling operating parameter values. When the indicator indicates "idle" (which may mean that the device is wholly idle or mostly idle), the operative scaling ratio selected by module 472 is applied, and the hardware 424 operates at the floor operating parameter values. Because of this comparatively simple operation, is not necessary to employ a comparator 22 in device 410 as for device 10.

It will be appreciated that, like device 10 (FIG. 1), device 410 (FIG. 4) also defines a hardware "path" and a software "path" that operate in parallel and which collectively effect the power management scheme. However, in this case the product of the hardware path (activity monitor 420) is simply a binary "busy" or "idle" value (i.e. activity level 421) which dictates whether or not the scaling ratio computed by the software path should be applied by configurable hardware 424.

Operation of software path in the embodiment of FIG. 4 is similar to the operation 300 of the software path of the first embodiment, described above, with several exceptions. First, adjustment of the floor value (S304) takes the form of selecting a scaling ratio. Second, adjustment of the ceiling value (S306) is not performed. Third, no operating parameter range per se is applied (S308). Rather, the selected scaling ratio is applied by the hardware 424.

Operation of the hardware path of FIG. 4 simply comprises periodically updating the current activity level 421 by sampling the currently important signals over a sampling interval.

Although the alternative embodiment of FIG. 4 is not capable of setting ceiling values in the manner described for the embodiment of FIG. 1, a ceiling value adjustment may effectively be achieved through the selection of a new state which has a different operating parameter ceiling value than a previous state. As a result, the number of states defined in state table 432 (and the number of corresponding state identifiers 450) may be larger than in state table 32 of FIG. 1, in order to support a number of possible ceiling values.

As will be appreciated by those skilled in the art, modifications to the above-described embodiments can be made without departing from the essence of the invention. For example, the present disclosure describes a power management scheme for a GSS 10. Of course, a similar scheme could be used for any power-consuming device, whether electrical or otherwise.

It will be appreciated that some embodiments may not employ predefined power consumption states and thus may not initially set operating parameter floor and ceiling values by reference to a current state. In such "stateless" systems, floor and ceiling operating parameter values may initially be set to predetermined values that are not state-dependent. Thereafter, range determination may be performed as described above (i.e. based on loading factors and limiting factors) in relation to these floor and ceiling values. In such stateless systems, state selection factors may be treated as limiting factors, i.e., may have a bearing on ceiling operating parameter values. For example, if the power source for the device changes from an AC power adapter to a battery, ceiling operating parameter values may be automatically adjusted downwardly in order to extend battery life. The device configuration module 74 may operate as described above. Such embodiments may not have a state table 32, state identifiers 50 or state selector software module 70.

One of the above-described embodiments employs a comparator 22 which adjusts operating parameter values based not only on a current activity level 21, but also on a target activity level 23 that is configurable through software. It will be appreciated that some embodiments may not employ a software-configurable target activity level 23. For example, a predetermined, desired activity level may be "hard-wired" within the device 10.

In some embodiments, it is possible that the power management driver 30 may control the operation of not only configurable hardware 24 or 424, but also the operation of software which bears on power consumption. Such software may be configurable to operate in multiple modes resulting in multiple levels of power consumption at the device.

The software paths in the above-described embodiments could alternatively be effected by hardware or firmware. As well, the hardware paths in the above-described embodiments could alternatively be effected by software or firmware.

Other modifications will be apparent to those skilled in the art and, therefore, the invention is defined in the claims.

What is claimed is:

1. A method of operating a power-consuming computational device, comprising:
    receiving at least one indicator of at least one current device operating configuration that affects an amount of power required to operate the device and that requires a minimum processing power;
    based on said at least one indicator, determining a floor value for an operating parameter of the device that allows said computational device to provide said minimum processing power;
    further receiving at least one further indicator of at least one current device operating condition;
    based on said at least one further indicator, determining a ceiling value for said operating parameter; and
    based on an indicator of current activity of the device, dynamically adjusting said operating parameter to a value between said floor value and said ceiling value, to control power consumption by the device, while providing said minimum processing power.

2. The method of claim 1 further comprising periodically repeating said receiving, said determining said floor value, said further receiving, and said determining said ceiling value.

3. The method of claim 1 wherein said adjusting is additionally based on a configurable target activity level for the device.

4. The method of claim 3 wherein said adjusting comprises computing a difference between the current activity of the device and the target activity level for the device and adjusting said operating parameter based on said difference.

5. The method of claim 1 wherein said determining a floor value comprises adjusting a predefined floor value associated with a current power consumption state.

6. The method of claim 1 wherein said determining a ceiling value comprises adjusting a predefined ceiling value associated with a current power consumption state.

7. The method of claim 1 wherein said power-consuming computational device is a graphics subsystem and wherein said at least one current device operating configuration that affects said amount of power required to operate the device and that requires a minimum processing power comprises one or more a current number and type of display devices being driven by said graphics subsystem, a current mode of operation of one or more display devices being driven by said graphics subsystem, a presence of video overlay processing at said graphics subsystem, and a presence of display scaling processing at said graphics subsystem.

8. The method of claim 7 wherein said mode of operation is selected from the set consisting of image resolution, color depth and refresh rate.

9. The method of claim 1 wherein said power-consuming computational device is a graphics subsystem and wherein said at least one current device operating condition indicated by said at least one further indicator comprises one or more of a power supply characteristic of a power supply currently powering said graphics subsystem and a temperature of a component of said graphics subsystem.

10. The method of claim 1 wherein said operating parameter is selected from the set consisting of a frequency of a clock signal at the device and a voltage level to be applied to electronic circuitry at the device.

11. A method of operating a power-consuming computational device, comprising:
    receiving at least one indicator of at least one current device operating configuration affecting the amount of power required to operate the device and requiring a minimum processing power;
    based on said at least one indicator, determining an operating range for an operating parameter of the device that allows said computational device to provide said minimum processing power; and
    based on a current activity level of the device, dynamically adjusting said operating parameter within said range, to control power consumption by the device, while providing said minimum processing power.

12. The method of claim 11 wherein said at least one indicator comprises a first set of indicators of one or more current device operating configurations affecting a minimum amount of power required to operate the device and requiring a minimum processing power and a second set of indicators of one or more current device operating conditions affecting a maximum amount of power to be consumed by the device, wherein said determining a range of values comprises determining a floor value for said operating parameter that allows said computational device to provide said minimum processing power and that is based on said first set of indicators and determining a ceiling value for said operating parameter based on said second set of indicators, and wherein said dynamically adjusting comprises setting said operating parameter to a value that is greater than or equal to said floor value and less than or equal to said ceiling value, while providing said minimum processing power.

13. The method of claim 12 wherein said adjusting comprises applying a scaling ratio if said current activity level indicates that said device is wholly or mostly idle.

14. A machine-readable medium storing machine-executable code for execution by a power-consuming computational device, comprising:
   machine-executable code for receiving at least one indicator of at least one current device operating configuration that affects an amount of power required to operate the device and that requires a minimum processing power;
   machine-executable code for determining, based on said at least one indicator, a floor value for an operating parameter of the device that allows said computational device to provide said minimum processing power and that is capable of dynamic adjustment for controlling power consumption by the device, while providing said minimum processing power;
   machine-executable code for further receiving at least one further indicator of at least one current device operating condition; and
   machine-executable code for determining, based on said at least one further indicator, a ceiling value for said operating parameter.

15. The machine-readable medium of claim 14 further comprising machine-executable code for causing said machine-executable code for receiving, said machine-executable code for determining said floor value, said machine-executable code for further receiving, and said machine-executable code for determining said ceiling value to be periodically re-executed.

16. The machine-readable medium of claim 14 further comprising machine-executable code for dynamically adjusting, based on an indicator of current activity of the device, said operating parameter to a value between said floor value and said ceiling value, to control power consumption by the device while providing said minimum processing power.

17. The machine-readable medium of claim 16 wherein said machine-executable code for adjusting is additionally based on a configurable target activity level for the device.

18. The machine-readable medium of claim 17 wherein said machine-executable code for adjusting comprises machine-executable code for computing a difference between the current activity of the device and the target activity level for the device and machine-executable code for adjusting said operating parameter based on said difference.

19. The machine-readable medium of claim 14 wherein said machine-executable code for determining a floor value comprises machine-executable code for adjusting a predefined floor value associated with a current power consumption state.

20. The machine-readable medium of claim 14 wherein said machine-executable code for determining a ceiling value comprises machine-executable code for adjusting a predefined ceiling value associated with a current power consumption state.

21. The machine-readable medium of claim 14 wherein said power-consuming computational device is a graphics subsystem and wherein said at least one current device operating configuration that affects said amount of power required to operate the device and that requires a minimum processing power comprises one or more a current number and type of display devices being driven by said graphics subsystem, a current mode of operation of one or more display devices being driven by said graphics subsystem, a presence of video overlay processing at said graphics subsystem, and a presence of display scaling processing at said graphics subsystem.

22. The machine-readable medium of claim 14 wherein said power-consuming computational device is a graphics subsystem and wherein said at least one current device operating condition indicated by said at least one further indicator comprises one or more of a power supply characteristic of a power supply currently powering said graphics subsystem and a temperature of a component of said graphics subsystem.

23. A power-consuming computational device comprising:
   a processor; and
   memory in communication with said processor storing:
      machine-executable code for receiving at least one indicator of at least one current device operating configuration that affects an amount of power required to operate the device and that requires a minimum processing power;
      machine-executable code for determining, based on said at least one indicator, a floor value for an operating parameter of the device that allows said computational device to provide said minimum processing power and that is capable of dynamic adjustment for controlling power consumption by the device, while providing said minimum processing power;
      machine-executable code for further receiving at least one further indicator of at least one current device operating condition; and
      machine-executable code for determining, based on said at least one further indicator, a ceiling value for said operating parameter.

24. The device of claim 23 wherein said memory further stores machine-executable code for causing said machine-executable code for receiving, said machine-executable code for determining said floor value, said machine-executable code for further receiving, and said machine-executable code for determining said ceiling value to be periodically re-executed.

25. The device of claim 24 further comprising circuitry for dynamically adjusting, based on an indicator of current activity of the device, said operating parameter to a value between said floor value and said ceiling value, to control power consumption by the device, while providing said minimum processing power.

26. A power-consuming computational device comprising:
   circuitry for receiving at least one indicator of at least one current device operating configuration that affects an amount of power required to operate the device and that requires a minimum processing power;
   circuitry for determining, based on said at least one indicator, a floor value for an operating parameter of the device that allows said computational device to provide said minimum processing power;
   circuitry for further receiving at least one further indicator of at least one current device operating condition;
   circuitry for determining, based on said at least one further indicator, a ceiling value for said operating parameter; and
   circuitry for dynamically adjusting, based on an indicator of current activity of the device, said operating parameter to a value between said floor value and said ceiling value, to control power consumption by the device, while providing said minimum processing power.

27. A method of operating a power-consuming device, comprising:

determining a current power consumption state;

based on said current power consumption state, determining a floor value and a ceiling value for an operating parameter of the device;

receiving at least one indicator of at least one current device operating condition that affects an amount of power required to operate the device;

based on said at least one indicator, adjusting said floor value for said operating parameter of the device;

further receiving at least one further indicator of at least one current device operating condition;

based on said at least one further indicator, adjusting said ceiling value for said operating parameter; and based on an indicator of current activity of the device, dynamically adjusting said operating parameter to a value between said adjusted floor value and said adjusted ceiling value, to control power consumption by the device.

28. The method of claim 27 further comprising periodically repeating said determining a current power consumption state, said determining said floor value and said ceiling value, said receiving, said adjusting said floor value, said further receiving, and said adjusting said ceiling value.

29. The method of claim 27 wherein said adjusting said operating parameter comprises computing a difference between the current activity of the device and the target activity level for the device and adjusting said operating parameter based on said difference.

* * * * *